(No Model.)
G. SURRATT.
TIRE ADJUSTER.
No. 424,692. Patented Apr. 1, 1890.
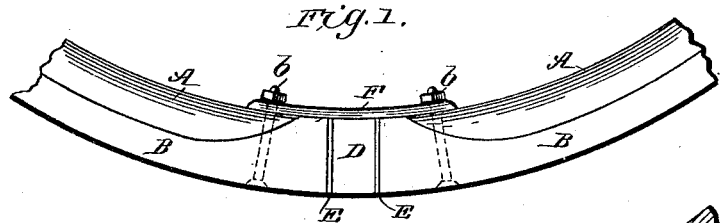
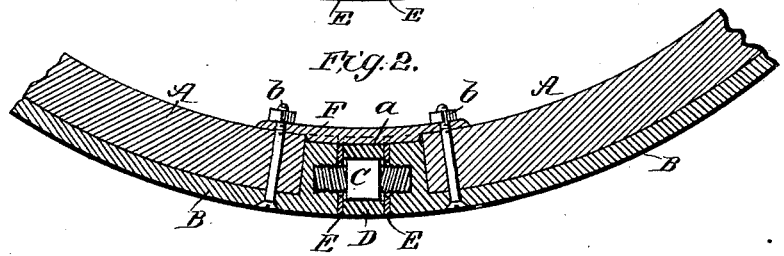
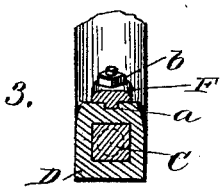
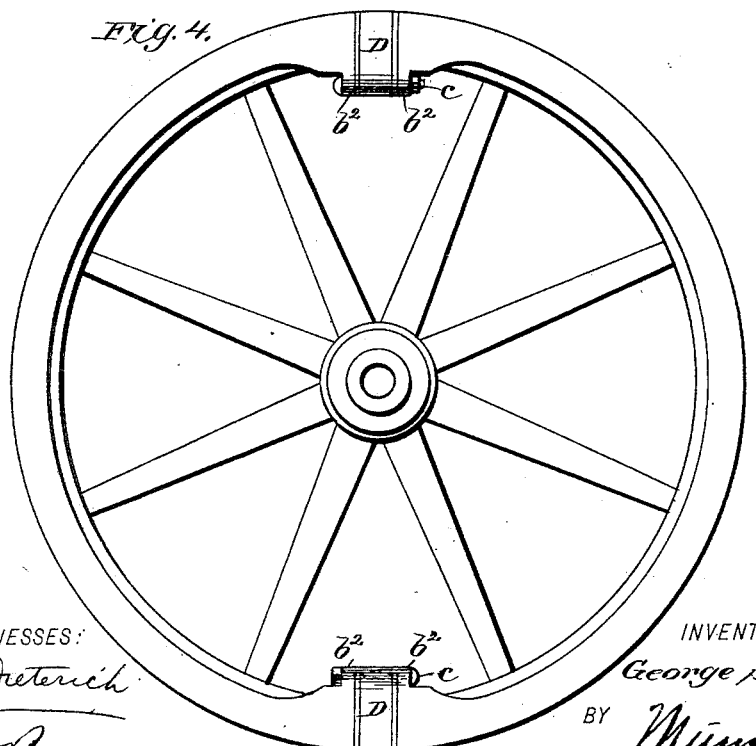
WITNESSES:
Fred G. Dieterich
Edw. W. Byrn
INVENTOR:
George Surratt
BY Munn & Co.
ATTORNEYS

UNITED STATES PATENT OFFICE.

GEORGE SURRATT, OF GAINESVILLE, TEXAS, ASSIGNOR OF THREE-FOURTHS TO HORACE B. FLETCHER, SHELBY L. POST, AND FRANK L. GALIGHER, OF SAME PLACE.

TIRE-ADJUSTER.

SPECIFICATION forming part of Letters Patent No. 424,692, dated April 1, 1890.

Application filed January 16, 1890. Serial No. 337,153. (No model.)

*To all whom it may concern:*

Be it known that I, GEORGE SURRATT, of Gainesville, in the county of Cooke and State of Texas, have invented a new and useful Improvement in Tire-Adjusters, of which the following is a specification.

My invention is in the nature of an improved tire-adjuster for vehicle-wheels, designed for the purpose of tightening the tire when it becomes too loose for the wheels and to expand the tire when it becomes too tight; and it consists in the peculiar construction and arrangement of the tire-joint, which I will now proceed to describe with reference to the drawings, in which—

Figure 1 is a side view of the tire-joint. Fig. 2 is a longitudinal section through the same; Fig. 3, a transverse section through line 1 1, and Fig. 4 a side view of a wheel embodying a modification.

Referring to Figs. 1, 2, and 3, A A represent the ends of the felly, and B B the ends of the tire, which approach each other to form the joint. The ends of the tire are thickened to form terminal lugs, which are bored to form sockets, that are screw-threaded in opposite directions to receive the opposite ends of a right and left screw-stem. C is this screw-stem, whose middle portion, as shown, is made square, and whose ends are screw-threaded in opposite directions.

D is a turning block corresponding in cross-section and external shape to the terminal ends of the tire and perforated with a square hole to receive and snugly fit the square middle portion of the screw-stem. The inner faces of this turning block and the terminal lugs of the tire are slotted or channeled longitudinally on a line with the inner face of the felly, and into this channel is received the rib $a$ of a clip-plate F, which is connected to the ends of the felly and tire by means of tire-bolts $b$.

E are filling-plates of sheet metal, corresponding to the cross-section of the turning block and adapted to be fitted between the latter and the abutting terminal ends of the tire.

The function and method of adjusting the various parts are as follows: The turning block D is designed to be seized by a wrench and turned about the axis of the screw-stem, and as its square perforation embraces the square middle portion of the screw-stem this block in turn acts like a wrench to turn the screw-stem, and its right and left threaded ends, entering the sockets of the tire, draw the two sections together, one or more filling-plates E being used upon one or both sides of the block, according to the necessities of the case. The clip F is then applied, and its rib $a$, fitting in the channel at the top of the block and the ends of the tire, locks the turning block, so that its tread-face is locked in coincidence with the tread of the tire, thereby preventing this block from accidentally turning. The object in making the block to slide loosely on the squared portion of the screw-stem is to permit the block to be shifted a little to one side or the other to adapt it to the thickness of the filling-plates on each side, insuring a tight fit at the joints, with the outer face of the turning block always in the plane of the outer face of the tire.

In fitting the turning block to the screw-stem it is not necessary that the block should have a square hole and the screw a square shoulder; but any connection which causes the block and screw to turn together and yet slide independently upon each other may be used. Thus, for instance, a hexagonal or octagonal fitting may be employed, or a feather or spline connection may be used.

In the form of joint thus far described the clip F forms a neat finish for locking the turning block, such as I prefer to use for light vehicles. For heavy work, however, I use a different means for locking this turning block, as shown in Fig. 4. For this use the terminal ends of the tire are formed with perforated ears $b^2$ $b^2$, and the turning block has a hole coincident with the holes in these ears, through all of which a bolt $c$ is passed, so as to lock the block against turning.

As shown, the tires are made of channel-iron with flanges at the sides of the felly and terminating in the enlarged socket-lugs; but it is obvious that my improvement is applicable, also, to plain tires. The terminal tire-lugs, with the joint-sections, may also be constructed apart from the tire, so as to adapt the invention to be applied to tires already in use by any blacksmith.

Having thus described my invention, what I claim as new is—

1. The combination, with the terminal tire-lugs having right and left screw-threaded sockets, of a right and left screw-stem, a turning block of substantially the same cross-section as the rim of the wheel, connected to the screw-stem so as to slide thereon but revolve rigidly together, and means, substantially as described, for locking the turning block to the terminal lugs.

2. The combination, with the terminal tire-lugs having right and left screw-threaded sockets, of a right and left screw-stem, a turning block of substantially the same cross-section as the rim of the wheel, connected to the screw-stem so as to slide thereon but revolve with it, the said block and lugs being channeled, as described, and the clip-plate F, with rib $a$ entering said channel, and bolts securing the clip-plate, substantially as shown and described.

3. The combination, with the terminal tire-lugs having right and left screw-threaded sockets, of a right and left screw-stem, a turning block mounted upon it to slide on but revolve with it, locking devices for the said block, and filling-plates interposed between the blocks and terminal lugs, substantially as and for the purpose described.

The above specification of my invention signed by me in the presence of two subscribing witnesses.

GEORGE SURRATT.

Witnesses:
EDWD. W. BYRN,
SOLON C. KEMON.